United States Patent
Ishizaki

(10) Patent No.: US 10,630,136 B2
(45) Date of Patent: Apr. 21, 2020

(54) AIR-CONDITIONING BLOWER MOTOR UNIT

(71) Applicant: KEIHIN CORPORATION, Tokyo (JP)

(72) Inventor: Masaaki Ishizaki, Sakura (JP)

(73) Assignee: KEIHIN CORPORATION, Tokyo (JP)

( * ) Notice: Subject to any disclaimer, the term of this patent is extended or adjusted under 35 U.S.C. 154(b) by 138 days.

(21) Appl. No.: 15/882,091

(22) Filed: Jan. 29, 2018

(65) Prior Publication Data

US 2018/0226857 A1 Aug. 9, 2018

(30) Foreign Application Priority Data

Feb. 8, 2017 (JP) .................................. 2017-021100

(51) Int. Cl.
| | |
|---|---|
| *H02K 5/24* | (2006.01) |
| *F04D 25/06* | (2006.01) |
| *F04D 29/66* | (2006.01) |
| *H02K 1/16* | (2006.01) |
| *H02K 5/16* | (2006.01) |

(Continued)

(52) U.S. Cl.
CPC ............ *H02K 5/24* (2013.01); *F04D 25/062* (2013.01); *F04D 29/668* (2013.01); *H02K 1/16* (2013.01); *H02K 1/2786* (2013.01); *H02K 3/522* (2013.01); *H02K 5/161* (2013.01); *H02K 5/1735* (2013.01); *H02K 5/225* (2013.01); *H02K 7/14* (2013.01); *H02K 11/30* (2016.01); *H02K 11/33* (2016.01); *F04D 25/08* (2013.01); *F24F 7/007* (2013.01); *H02K 2211/03* (2013.01)

(58) Field of Classification Search
CPC .......... F04D 25/06; F04D 25/08; F04D 29/66; F04D 25/062; F04D 29/668; F24F 7/007; H02K 1/16; H02K 1/27; H02K 11/30; H02K 5/16; H02K 5/22; H02K 7/14; H02K 5/24; H02K 1/2786; H02K 5/161; H02K 5/225; H02K 2211/03
USPC ..................................... 310/90, 91, 400–433
See application file for complete search history.

(56) References Cited

U.S. PATENT DOCUMENTS

| | | | |
|---|---|---|---|
| 5,905,320 A * | 5/1999 | Periyathamby | .......... H02K 5/24 310/51 |
| 6,236,126 B1 | 5/2001 | Yagi et al. | |

(Continued)

FOREIGN PATENT DOCUMENTS

| | | |
|---|---|---|
| CN | 101286667 | 10/2008 |
| JP | 09-308184 A | 11/1997 |

(Continued)

OTHER PUBLICATIONS

Chinese Office Action with English Translation dated Jul. 22, 2019, 12 pages.

(Continued)

*Primary Examiner* — Naishadh N Desai
(74) *Attorney, Agent, or Firm* — Rankin, Hill & Clark LLP

(57) ABSTRACT

An air-conditioning blower motor unit includes a brushless motor that is controlled by electronic parts arranged on a circuit board. A rotation shaft of the brushless motor that rotates a blower fan is rotatably held by bearing holders. The bearing holders and the circuit board are held by a support disk without overlapping each other. The support disk is held by the bearing holders via a vibration absorber.

7 Claims, 4 Drawing Sheets

(51) Int. Cl.
  *H02K 5/22*    (2006.01)
  *H02K 7/14*    (2006.01)
  *H02K 11/30*   (2016.01)
  *H02K 1/27*    (2006.01)
  *H02K 3/52*    (2006.01)
  *H02K 5/173*   (2006.01)
  *H02K 11/33*   (2016.01)
  *F04D 25/08*   (2006.01)
  *F24F 7/007*   (2006.01)

(56) References Cited

U.S. PATENT DOCUMENTS

| | | | |
|---|---|---|---|
| 6,339,267 B1 * | 1/2002 | Fujii | F16F 1/3732 |
| | | | 310/51 |
| 2008/0218009 A1 | 9/2008 | Fukuno et al. | |
| 2008/0252154 A1 * | 10/2008 | Yamashita | H02K 5/04 |
| | | | 310/51 |
| 2010/0033041 A1 * | 2/2010 | Watanabe | F04D 19/007 |
| | | | 310/63 |

FOREIGN PATENT DOCUMENTS

| | | |
|---|---|---|
| JP | 2001-16836 | 1/2001 |
| JP | 2001-145300 | 5/2001 |
| JP | 2008-259407 | 10/2008 |
| JP | 2013-128389 A | 6/2013 |

OTHER PUBLICATIONS

Japanese Office Action with English translation, dated Jan. 28, 2020, 8 pages.

* cited by examiner

AIR-CONDITIONING BLOWER MOTOR UNIT

CROSS-REFERENCE TO RELATED APPLICATION

This application is based upon and claims the benefit of priority from Japanese Patent Application No. 2017-021100 filed on Feb. 8, 2017, the contents of which are incorporated herein by reference.

BACKGROUND OF THE INVENTION

Field of the Invention

The present invention relates to an air-conditioning blower motor unit that rotates a blower fan by a brushless motor.

Description of the Related Art

In a vehicle air-conditioning device, a blower fan that composes an air-conditioning blower motor unit rotates to blow air. This blower fan rotates under an action of a brushless motor. That is, the brushless motor includes a stator that includes electromagnetic coils, and a rotor that functions as a yoke and includes a rotation disk of a cup shape that holds permanent magnets. When an alternating electric current flows through the electromagnetic coils, alternating magnetic fields are formed between the electromagnetic coils and the permanent magnets. As a result, the rotor rotates, and a rotation shaft held by the rotor and the blower fan attached to the rotation shaft rotate.

An output of the brushless motor and, in addition, a rotation speed of the blower fan are controlled by a control circuit arranged on a circuit board. The control circuit is provided with electronic parts such as a capacitor, a resistor and a switching element. These electronic parts are electronically connected to the electromagnetic coils that compose the brushless motor.

As the rotation shaft and the blower fan integrally rotate, the brushless motor vibrates. The vibrations transmitted to a casing become a noise factor. Therefore, in order to prevent generation of noise, a vibration absorbing member that absorbs the vibrations and hinders transmission of the vibrations is arranged. For example, according to Japanese Laid-Open Patent Publication No. 2008-259407, a vibration absorbing member is disposed between a bearing housing portion that is a center piece that supports a stator, and a stator core.

Japanese Laid-Open Patent Publication Nos. 2001-016836 and 2001-145300 disclose using two divided vibration absorbers.

SUMMARY OF THE INVENTION

A technique disclosed in Japanese Laid-Open Patent Publication No. 2008-259407 supports the stator in a floating state with respect to the bearing housing portion yet does not support the rotor in a floating state. Hence, vibrations of the rotor are transmitted to the bearing housing portion. Moreover, a lower center piece that composes the center piece has a larger diameter than a stator. Therefore, the entire lower center piece becomes a sound producing portion that vibrates and produces sounds. Therefore, it is difficult to reduce noise.

Techniques disclosed in Japanese Laid-Open Patent Publication Nos. 2001-016836 and 2001-145300 employ configurations of holding motors in casings by interposing vibration absorbers in flanges provided in bearing housings. However, in this case, the flanges are outer surfaces of ceiling portions of the casings. Moreover, the rotors are also disposed outside the casings. Therefore, the flanges and rotors readily become sound producing portions, and have difficulty in realizing noise reduction.

A main object of the present invention is to provide an air-conditioning blower motor unit that can prevent transmission of vibration caused by a brushless motor to other members.

One embodiment of the present invention is an air-conditioning blower motor unit configured to rotate a blower fan by a brushless motor including a stator and a rotor, the stator including a plurality of electromagnetic coils each formed by winding wires around an insulation member covering a stator core, and the rotor holding a permanent magnet and rotatable along a periphery of the stator, the blow motor unit including: a metal bearing holder holding the stator and rotatably supporting a rotation shaft of the brushless motor; a circuit board provided with an electronic part configured to control the brushless motor; and a metal support disk holding the bearing holder and the circuit board at positions that do not overlap each other, and the support disk holds the bearing holder via a vibration absorber.

Thus, according to the present invention, the vibration absorber is interposed between the bearing holder that supports the rotor and the stator of the brushless motor, and the support disk that holds the circuit board. When the brushless motor vibrates as the electromagnetic coils that compose the brushless motor are energized, and the rotor and the rotation shaft integrally rotate, the vibration absorber appropriately deforms (for example, warps). This deformation absorbs the vibrations propagating from the brushless motor toward the support disk.

Since the vibration absorber is interposed, the vibrations caused by the brushless motor are hardly transmitted to the support disk. Therefore, the vibrations have difficulty in being transmitted to the circuit board and the casing over the support disk. As a result, it is possible to prevent resonance of the casing, and realize noise reduction of the air-conditioning blower motor unit. In other words, it is possible to obtain a suitably silent air-conditioning blower motor unit.

The bearing holder preferably includes a first bearing holding member being hollow and holding the stator, and a second bearing holding member partially inserted into a hollow interior of the first bearing holding member, and is smaller in diameter than a yoke portion that forms an annular shape of the stator core. In this case, it is possible for the bearing holder to avoid formation of a flange that is likely to become a sound producing portion that vibrates and causes noise, making the diameter and the area of the bearing holder as small as possible. Moreover, the vibration absorber fits onto the bearing holder. Consequently, it is possible to interpose the vibration absorber between the stator and the support disk, and prevent the vibrations from being transmitted to the support disk.

A clearance is preferably formed between the vibration absorber and the insulation member. In other words, the vibration absorber and the insulation member may be separated at a predetermined distance. Consequently, it is possible to avoid the deformed vibration absorber from coming into contact with the insulation member when the rotation shaft rotates. Consequently, it is possible to avoid occurrence of contact sounds and improve quietness.

Preferably, the vibration absorber includes a plurality of fan-shaped portions arranged along a circumferential direction of the rotation shaft, and between the adjacent fan-shaped portions, the bearing holder is locked and end portions of the wires are inserted. Since the fan-shaped portions that occupy most of the outer periphery of the vibration absorber surrounding the bearing holder, larger vibrations due to fluctuating loads of the brushless motor (based on the rotation speed of the rotor) can be damped at the vibration absorber mainly formed by the fan-shaped portions. By passing the end portions (connection portions) of the wires through recesses between the fan-shaped portions, it is possible to form the connection portions in linear shapes. Consequently, it is possible to electrically connect the electromagnetic coils and the circuit board at a minimum distance.

Preferably, the fan-shaped portions protrude from an outer wall in a middle of the vibration absorber in a thickness direction, and have a diameter larger than a diameter of the bearing holder, and have one end surface in contact with one end surface of the yoke portion. The plurality of fan-shaped portions set to have a larger diameter than a diameter of the bearing holder support one end surface of the stator core from a plurality of directions. Consequently, it is possible to prevent precession of the brushless motor.

The vibration absorber can be configured to include a first vibration absorber formed by an annular body, and a second vibration absorber formed by an annular body provided with the fan-shaped portions, and having a larger diameter than the first vibration absorber. The first vibration absorber and the second vibration absorber are made by, for example, injection molding. The second vibration absorber is provided with the fan-shaped portions. Therefore, portions having different outer diameters are arranged in a mixed manner yet can be easily demolded when the second vibration absorber is injection-molded alone. Thus, the first vibration absorber and the second vibration absorber are individually made, and therefore are easily injection-molded.

The support disk formed as a member different from the bearing holder is preferably positioned and fixed at a hollow interior of a casing formed by a first casing member and a second casing member. The bearing holder and the support disk are different members, and the vibration absorber is interposed therebetween. Therefore, the vibrations are not easily transmitted from the brushless motor to the casing via the support disk. Hence, the quietness further improves.

According to the present invention, the vibration absorber is interposed between the bearing holder that supports the rotor and the stator of the brushless motor, and the support disk that holds the circuit board. When the brushless motor vibrates as the rotor and the rotation shaft integrally rotate by energization of the electromagnetic coils that compose the brushless motor, the vibration absorber warps. This warping absorbs the vibrations propagating from the brushless motor toward the support disk. Consequently, it is possible to provide the suitably silent air-conditioning blower motor unit.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of an air-conditioning blower motor unit according to the present invention will be described in detail with reference to the accompanying drawings. Hereinafter, "lower" and "upper" respectively correspond to a lower side (Z1 direction) and an upper side (Z2 direction) in FIG. 1. The X1 direction shown in each figure refers to the same direction, and the same applies to X2, Y1, Y2, Z1 and Z2 directions, too. The X1 direction and the X2 direction in FIG. 1 respectively correspond to the farther side and closer side of the paper. The Z1 direction and the Z2 direction in FIG. 3B respectively correspond to the closer side and farther side of the paper. The Z1 direction and the Z2 direction in FIG. 4 respectively correspond to the farther side and closer side of the paper.

Figure 1:
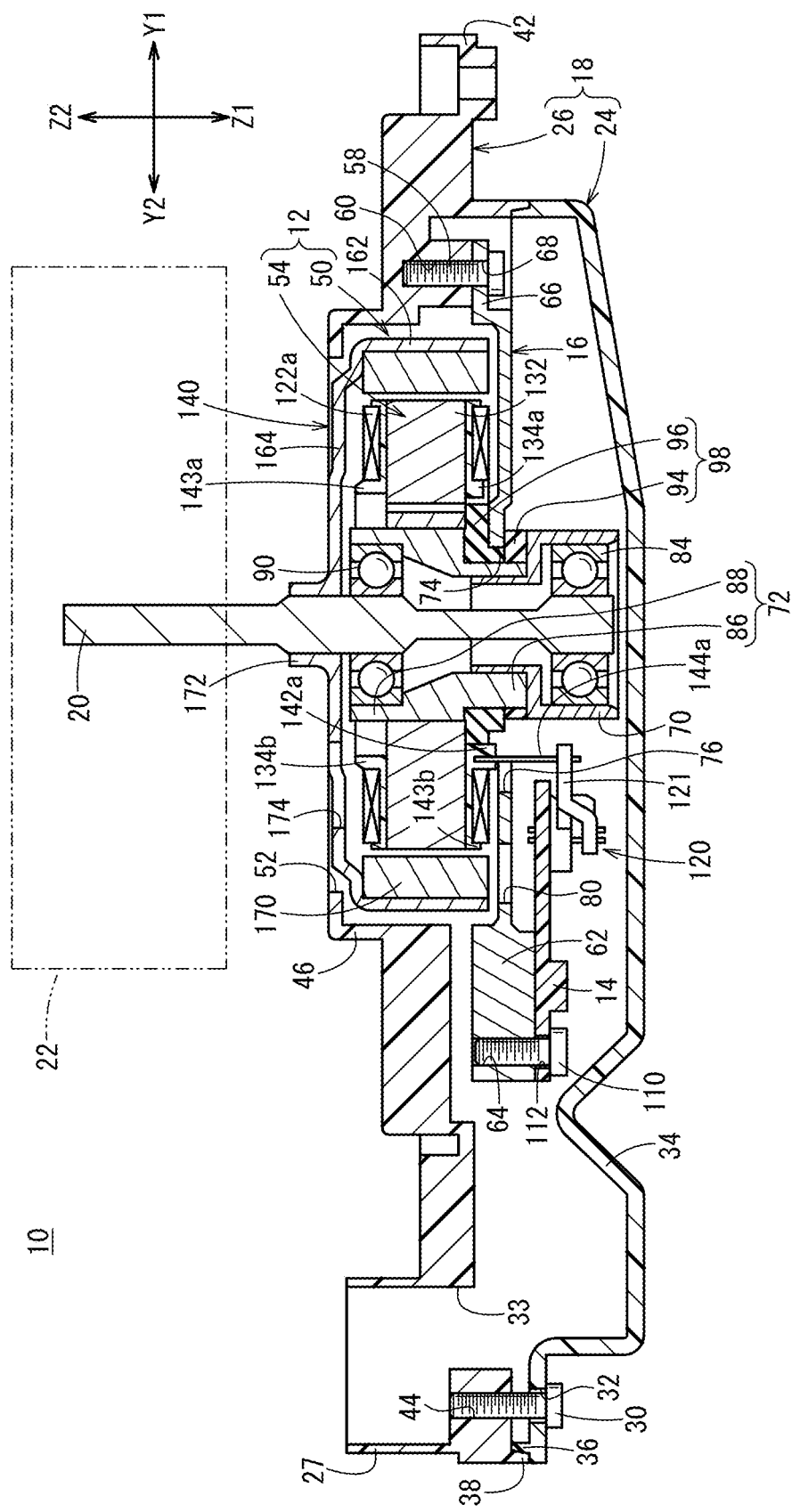
FIG. 1 is a schematic longitudinal cross-sectional view of an air-conditioning blower motor unit according to an embodiment of the present invention.

FIG. 1 is a schematic longitudinal cross-sectional view of an air-conditioning blower motor unit 10 according to the present embodiment. This air-conditioning blower motor unit 10 includes a brushless motor 12, a circuit board 14 that is provided with a control circuit that controls the brushless motor 12, a support disk 16 that supports the circuit board 14, and a casing 18 that houses these brushless motor 12, circuit board 14 and support disk 16. A blower fan 22 indicated by a virtual line is attached to a rotation shaft 20 of the brushless motor 12.

The casing 18 is formed by combining a lower half body (first casing member) and an upper half body 26 (second casing member) both of which are made of resin. The lower half body 24 is a hollow body having an open side that faces toward the upper half body 26. The upper half body 26 is a hollow body having an open side that faces toward the lower half body 24. That is, the lower half body 24 forms a bottom portion, and the upper half body 26 forms a ceiling portion. Hence, the casing 18 is also formed as a hollow body. A hollow interior of the hollow body forms a passage for cooling air introduced from a duct 27 (see FIG. 1) vertically arranged in the upper half body 26. The cooling air is an air flow generated by the rotating blower fan 22.

A plurality of (e.g., three) coupling screw insertion holes 32 are formed in the lower half body 24 and allow insertion of coupling screws 30 that couple the lower half body 24 to the upper half body 26. FIG. 1 shows one of the coupling screw insertion holes 32. As a matter of course, the coupling screw insertion holes 32 are formed at positions at which the flow of the cooling air is not prevented. A bottom wall portion of the lower half body 24 is bent toward the upper half body 26 to form a protrusion portion 34 of a substantially reverse V shape in the lower half body 24. This protrusion portion 34 functions as a guide portion that guides the cooling air.

A thin first fitting portion 36 is formed near an outer rim portion of an upper opening of the lower half body 24, and circles along the outer rim portion. A thin second fitting portion 38 is formed in a lower opening of the upper half body 26 and circles along the outer rim. When the upper half body 26 is assembled to the lower half body 24, the second fitting portion 38 surrounds the first fitting portion 36. That is, an outer surface of the first fitting portion 36 and an inner surface of the second fitting portion 38 come into contact with each other. Thus, the lower half body 24 and the upper half body 26 fit to each other.

The duct 27 is connected to a predetermined member such as a fan casing (not shown) of a so-called scroll shape that surrounds the blower fan 22. Three stay portions 42 are formed at a periphery portion of the upper half body 26, and couple the air-conditioning blower motor unit 10 to the fan casing.

Coupling screw holes 44 are formed in the upper half body 26 at portions corresponding to the coupling screw insertion holes 32. That is, the coupling screws 30 inserted in the coupling screw insertion holes 32 are screwed in the coupling screw holes 44. Thus, the lower half body 24 and the upper half body 26 are coupled to form the casing 18.

An annular protrusion portion 46 is formed protruding upward from a ceiling wall portion of the upper half body 26. A rotation shaft insertion opening 52 is formed at the annular protrusion portion 46 so as to surround the sidewall portion 162 of a rotor 50 described below. The rotation shaft 20 of the brushless motor 12 is exposed through this rotation shaft insertion opening 52. Meanwhile, a stator 54 and the rotor 50 that compose the brushless motor 12, and the circuit board 14 that controls the brushless motor 12, and the support disk 16 are housed in the casing 18. Support screw holes 60 are formed in a surface (i.e., back surface) of the upper half body 26 on a side facing toward the lower half body 24, and allow support screws 58 described below to be screwed therein.

The support disk 16 is made of thin metal. Approximately half of the support disk 16 formed in a substantially disk shape is an overlap portion that overlaps the circuit board 14. A heatsink portion 62 is integrally arranged at the overlap portion. The heatsink portion 62 is a heat dissipation portion that is provided with a plurality of uprising fins (not shown) to enlarge their surface areas. That is, the heatsink portion 62 facilitates heat dissipation of the circuit board 14 transmitted to the support disk 16.

The support disk 16 is housed in the casing 18 at such a posture that a lower surface of the heatsink portion 62 faces toward the protrusion portion 34 and the fins face toward the upper half body 26. Attachment screw holes 64 are formed in the heatsink portion 62 and several (two in the present embodiment) other portions to extend from the side facing toward the lower half body 24 to the side facing toward the upper half body 26.

Figure 2:
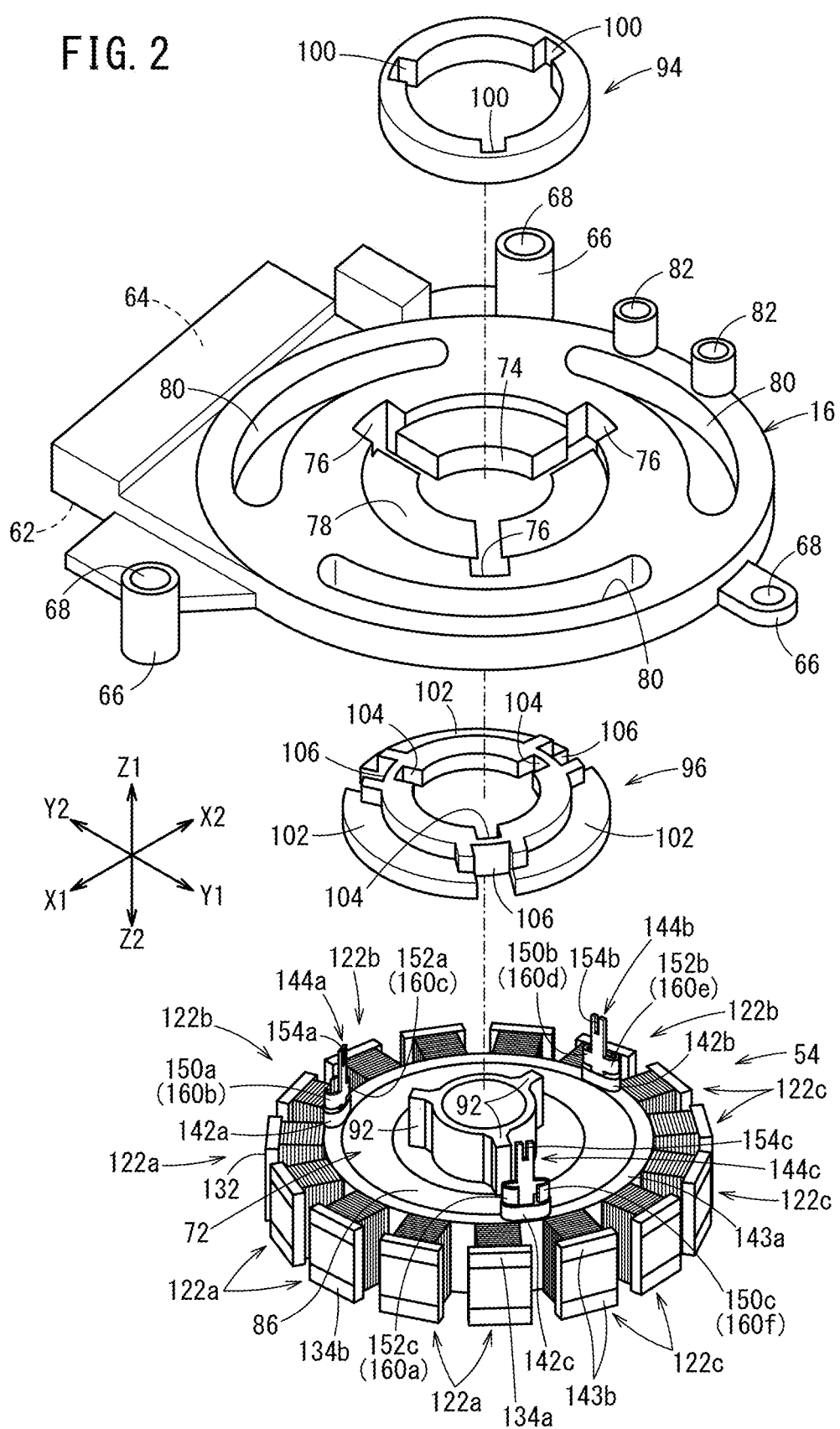
FIG. 2 is an exploded perspective view showing a main part of a stator, a vibration absorber and a support disk that compose the air-conditioning blower motor unit shown in FIG. 1.

As is understood with reference to FIG. 2, three screw base portions 66 protrude from an outer rim of the support disk 16, and are disposed at positions having phase differences of approximately 120° from each other. Support screw insertion holes 68 are formed in the screw base portions 66. The support screws 58 are inserted in the support screw insertion holes 68, and attach the support disk 16 to the upper half body 26.

At a center of the support disk 16, a holding hole 74 that holds metal bearing holders as formed by a first bearing holder 70 and a second bearing holder 72 (see FIG. 1) is formed, and three passage holes 76 that have shapes that dent from an inner circumferential wall of the holding hole 74 outwardly in a diameter direction are formed. An annular step portion 78 is formed at a lower end surface side of the support disk 16 by denting in the vicinity of an opening of the holding hole 74 toward an upper end surface.

A plurality of (e.g., three) vent holes 80 are formed in the support disk 16, and extend in arc shapes around the holding holes 74. A cylindrical screw portion 82 shown in FIG. 2 is formed near one of the vent holes 80.

The support disk 16 formed as described above can be obtained as a casting made of aluminum alloy, for example. In this support disk 16, a coupler housing in which a wire harness provided on a vehicle side is inserted (none of them are shown) is supported by holding screws (not shown) screwed in the cylindrical screw portions 82. The coupler housing is made of resin, and has an insulation property. The wire harness is electrically connected to an unillustrated conductive member whose distal end protrudes in the coupler housing.

The first bearing holder 70 includes a large lower end to which a first bearing 84 and an unillustrated wave washer are inserted and an upper end which is on a side facing toward the second bearing holder 72. The upper end is set to a smaller diameter than the large lower end. As is understandable from FIGS. 1 and 2, the second bearing holder 72 includes a small diameter lower end portion 86, and a large diameter upper end portion 88 having larger inner diameter and outer diameter than the small diameter lower end portion 86. The upper end of the first bearing holder 70 is inserted into the small diameter lower end portion 86. A second bearing 90 is inserted in the large diameter upper end portion 88. The first bearing 84 and the second bearing 90 are a pair of rolling bearings whose diameters are substantially the same. Both of the diametrically large lower end of the first bearing holder 70 that houses the first bearing 84, and the large diameter upper end portion 88 of the second bearing holder 72 that houses the second bearing 90 are set to the substantially same outer diameters. In other words, the diameters of the bearing holders are reduced as much as possible.

Three radial protrusion portions 92 radially protrude outwardly from an outer circumferential wall of the small diameter lower end portion 86 (see FIG. 2). The radial protrusion portions 92 are spaced at phase differences of approximately 120° from each other.

Figure 3A:
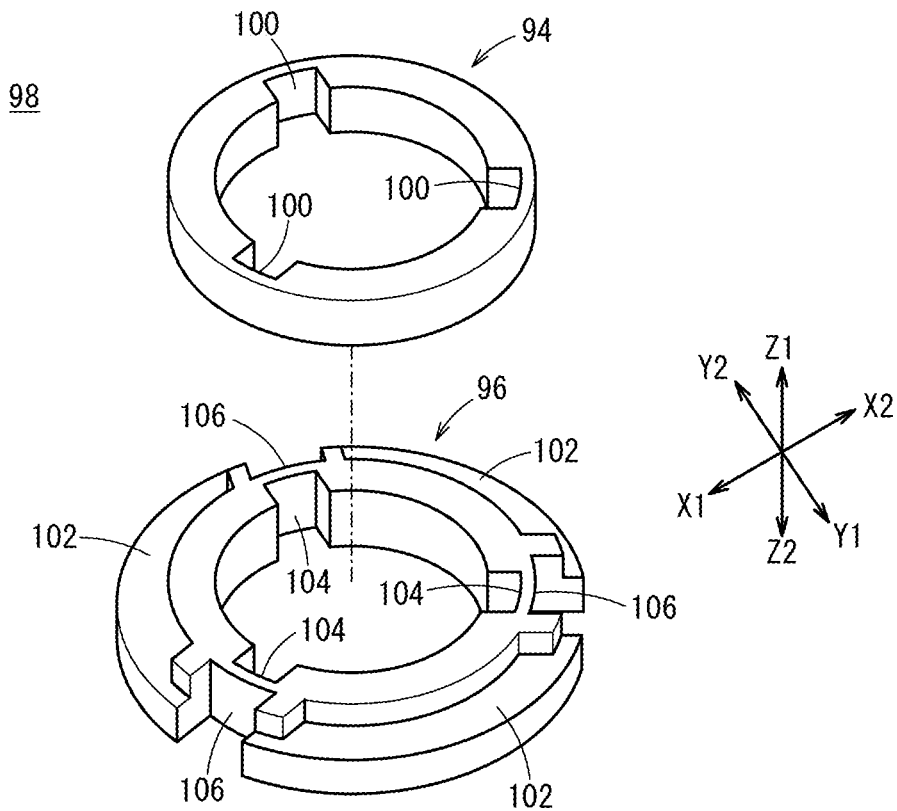
FIG. 3A is an exploded perspective view of the vibration absorber shown in FIG. 2.

The first bearing holder 70 and the second bearing holder 72 are fitted to the holding hole 74 via a rubber assembly 98 (vibration absorber) formed by combining a first vibration absorbing rubber member 94 (first vibration absorber) and a second vibration absorbing rubber member 96 (second vibration absorber) shown in FIG. 3A.

The first vibration absorbing rubber member 94 is an annular body that has a smaller diameter than the second vibration absorbing rubber member 96, and includes an inner wall portion that includes three first radial recess portions 100 recessed outwardly in the diameter direction. The three first radial recess portions 100 are spaced at approximately 120° in a circumferential direction from each other. Three fan-shaped portions 102 are formed in an outer wall of the second vibration absorbing rubber member 96 in the middle of the thickness direction (Z1 to Z2 direction). Each of the three fan-shaped portions 102 are spaced at approximately 120° in a circumferential direction from each other. The presence of the fan-shaped portions 102 makes the second vibration absorbing rubber member 96 as an annular body having a slightly larger diameter than the first vibration absorbing rubber member 94.

A portion (lower portion) that is not provided with the fan-shaped portions 102 in the second vibration absorbing rubber member 96 has a smaller diameter than a portion (upper portion) that is provided with the fan-shaped portions 102. The diameters differ in this way. Therefore, a step portion is formed in the thickness direction of the second vibration absorbing rubber member 96.

Three second radial recess portions 104 are formed in an inner wall portion of the second vibration absorbing rubber member 96, and are dented outwardly in the diameter direction at a phase corresponding to the phase of the first radial recess portions 100. The three second radial recess portions 104 are spaced at approximately 120° in a circumferential from each other. The adjacent fan-shaped portions 102 are distant from each other at the phase corresponding to the phase of the second radial recess portions 104. By this distance, third radial recess portions 106 that are dented inwardly in the diameter direction at the interval of approximately 120° are formed between the fan-shaped portions 102.

Figure 3B:
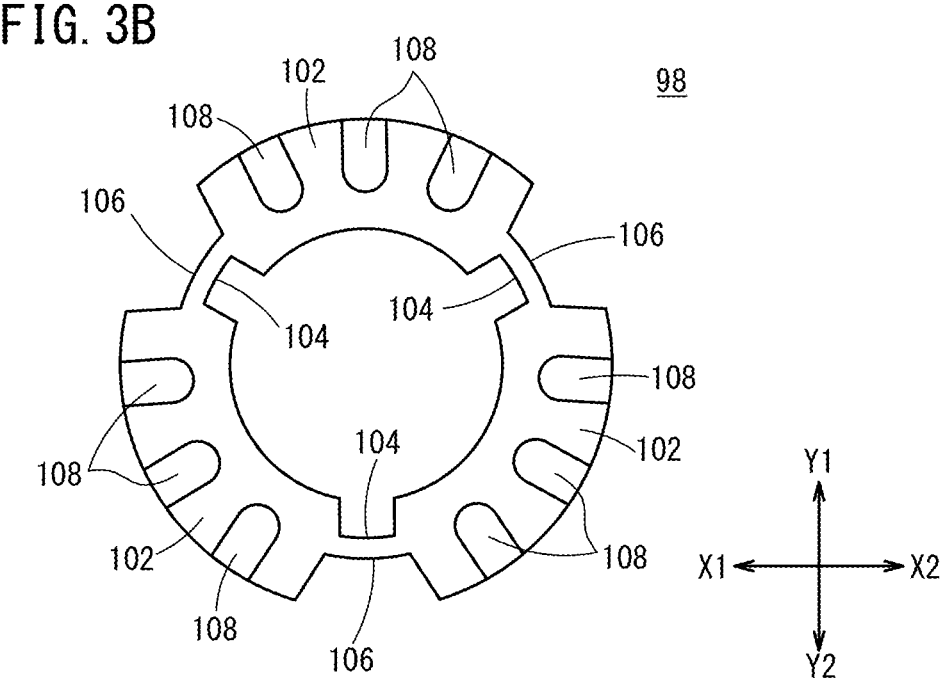
FIG. 3B is a plan view showing the vibration absorber seen from one end surface side of a fan-shaped portion.

A plurality of thickness recessed portions 108 are formed in back surfaces for surfaces of fan-shaped portions 102 facing toward the first vibration absorbing rubber member 94, along the circumferential direction as shown in FIG. 3B. That is, the first radial recess portions 100, the second radial recess portions 104, the third radial recess portions 106 and the thickness recessed portions 108 are formed in the rubber assembly 98. Consequently, the first vibration absorbing rubber member 94 and the second vibration absorbing rubber member 96 become flexible, and each spring constant becomes small compared to a case where the recess portions 100, 104, 106, 108 are not formed. The spring constants of the first vibration absorbing rubber member 94 and the second vibration absorbing rubber member 96 can be suitably adjusted to by changing the number and the depths of the recess portions 100, 104, 106, 108.

As shown in FIGS. 1 and 2, the surfaces of the fan-shaped portions 102 facing toward the first vibration absorbing rubber member 94 are in contact with the support disk 16. On the other hand, the back surfaces of the fan-shaped portions 102, i.e., the surfaces provided with the thickness recessed portions 108 are in contact with the yoke portion of the stator 54. Furthermore, a predetermined clearance is formed between the fan-shaped portions 102 and insulators 134a described below.

The rubber assembly 98 formed as described above is positioned by a step portion formed by different diameters of the lower end of the first bearing holder 70 and the upper end of the second bearing holder 72.

The first bearing holder 70 and the second bearing holder 72 rotatably support the rotation shaft 20 of the brushless motor 12 via the first bearing 84 and the second bearing 90 (see FIG. 1).

The circuit board 14 has a substantially semi-circular shape that overlaps approximately half of the support disk 16, and a portion which has a substantially linear shape is disposed facing toward the first bearing holder 70. Hence, in the plan view the circuit board 14 does not overlap (cover) with the bearing holders. Also, the circuit board 14 does not surround the periphery of the bearing holders.

That is, the bearing holders and the circuit board 14 are held by the support disk 16 at positions that do not overlap. The circuit board 14 is a sensorless control method that does not need a rotation detection sensor to control the brushless motor 12. Hence, the rotation detection sensor that detects a rotation angle state of the rotation shaft 20 does not need to be arranged near the rotation shaft 20 on the circuit board 14. Consequently, it is possible to arrange the bearing holders and the circuit board 14 distant from each other.

Attachment screw insertion holes 112 (see FIG. 1) through which attachment screws 110 are inserted are formed in the circuit board 14. Positions of the attachment screw insertion holes 112 correspond to positions of the attachment screw holes 64 formed in the heatsink portion 62 (fin back surface). The attachment screws 110 are inserted through the attachment screw insertion holes 112 and the attachment screws 110 are screwed in the attachment screw holes 64. Consequently, the circuit board 14 is supported on the support disk 16. The circuit board 14 is supported indirectly by the casing 18 via the support disk 16, and is not directly coupled to the casing 18.

On the circuit board 14, various electronic parts such as a capacitor, a resistor and a switching element are arranged, and wires (none of which is shown) form conductive paths to compose a control circuit. The control circuit controls a rotation speed of the rotation shaft 20.

The conductive member is electrically connected to the wires. The control circuit is energized (powered) via this conductive member. The conductive member is fixed to an upper side (upper surface) of the circuit board 14 by soldering or the like and protrudes from the circuit board 14. As described above, a protruding distal end side of the conductive member is housed in the coupler housing.

A bus bar unit 120 is supported on the circuit board 14. The bus bar unit 120 holds three bus bars 121 having flexibility. FIG. 1 shows a cross section of one of the three bus bars 121. Power is fed from the control circuit to U phase electromagnetic coils 122a, V phase electromagnetic coils 122b and W phase electromagnetic coils 122c (see FIG. 2) that compose the stator 54 via these bus bars 121.

As shown in FIG. 1, the brushless motor 12 includes the stator 54 that is positioned and fixed to an outer circumferential wall of the second bearing holder 72, and the rotor 50 that is held by the rotation shaft 20. The rotor 50 integrally rotates with the rotation shaft 20. The stator 54 is a member having an annular shape. The stator 54 includes a laminated core 132 (stator core). The laminated core 132 includes a yoke portion that has an annular shape at an inner circumference side of the stator 54 to form an inner hole that can house the second bearing holder 72 at the inner circumference side, and teeth portions that are formed protruding from an outer circumference of the yoke portion radially in a direction vertical to an axial line of the rotation shaft 20. The laminated core 132 is sandwiched from above and below by one pair of insulators 134a, 134b (insulation members). The stator 54 further includes the U phase electromagnetic coils 122a, the V phase electromagnetic coils 122b and the W phase electromagnetic coils 122c wound around the teeth portions of the laminated core 132 via the insulators 134a, 134b.

The yoke portion is positioned and fixed firmly to the outer circumferential wall of the second bearing holder 72. Meanwhile, the teeth portions face toward an inner circumferential wall of a rotation disk 140 that composes the rotor 50. That is, in this case, the brushless motor 12 is a so-called outer rotor type that the rotor 50 is positioned at an outer side of the stator 54. As described above, the diametrically large lower end of the first bearing holder 70 and the large diameter upper end portion 88 of the second bearing holder 72 have the substantially same outer diameters. Therefore, the bearing holders have smaller diameters than the yoke portion.

The adjacent teeth portions are distant from each other at predetermined intervals. That is, a clearance is formed between the teeth portions. This clearance is a path through which the cooling air passes.

As shown in FIG. 2, the insulators 134a below the laminated core 132 facing toward the support disk 16 are provided with a first terminal embedded portion 142a, a second terminal embedded portion 142b, and a third terminal embedded portion 142c extending toward the support disk 16 and the circuit board 14. Each of the first terminal embedded portion 142a, the second terminal portion 142b, and the third terminal embedded portion 142c is disposed to be located between the teeth portions adjacent to each other. A lower end of each of a first stator side terminal portion 144a, a second stator side terminal portion 144b, and a third stator side terminal portion 144c protrudes from each of these first terminal embedded portion 142a to third terminal embedded portion 142c toward the lower half body 24. That is, upper ends of the first stator side terminal portion 144a to the third stator side terminal portion 144c are embedded in the first terminal embedded portion 142a to the third terminal embedded portion 142c, respectively.

The insulators 134a, 134b include a yoke covering portion 143a that has an annular shape along the yoke portion at the inner circumference side, and teeth covering portions 143b that are formed protruding from an outer circumference of the yoke covering portion 143a along the teeth portions radially in the direction vertical to the axial line of the rotation shaft 20. An inner hole of the yoke covering portion 143a is formed to have a larger diameter than an inner hole of the yoke portion. Hence, a lower surface of the yoke portion is not covered by the insulators 134a, 134b, and is exposed on the inner end side.

Each of the first stator side terminal portion 144a to the third stator side terminal portion 144c exposed from the first terminal embedded portion 142a to the third terminal embedded portion 142c includes a first hook portion and a second hook portion that are folded back in a direction to protrude from lateral sides and approach each other, and a clamp portion that is formed by branching a lower end into two. For ease of understanding, reference numerals 150a, 152a, 154a are assigned to the first hook portion, the second hook portion and the clamp portion of the first stator side terminal portion 144a. Reference numerals 150b, 152b, 154b are assigned to the first hook portion, the second hook portion and the clamp portion of the second stator side terminal portion 144b. Reference numerals 150c, 152c, 154c are assigned to the first hook portion, the second hook portion and the clamp portion of the third stator side terminal portion 144c.

There are odd numbers of (five in the present embodiment) the U phase electromagnetic coils 122s that form the U phase, the V phase electromagnetic coils 122b that form the V phase and the W phase electromagnetic coils 122 that form the W phase. Each of the U phase electromagnetic coils 122a, the V phase electromagnetic coils 122b and the W phase electromagnetic coils 122c is formed by sequentially stretching one wire to the odd numbers of the teeth portions, i.e., five teeth portions adjacent to each other along the circumferential direction. Connection portions 160a, 160b are drawn from the ones of the U phase electromagnetic coils 122a located at both ends of the five U phase electromagnetic coils 122a. Similarly, connection portions 160c, 160d, and connection portions 160e, 160f are drawn from the V phase electromagnetic coils 122b and the W phase electromagnetic coils 122c located both ends of the five V phase electromagnetic coils 122b and the five W phase electromagnetic coils 122c.

The connection portions 160a, 160b are sandwiched by the second hook portion 152c of the third stator side terminal portion 144c, and the first hook portion 150a of the first stator side terminal portion 144a, respectively. The connection portions 160c, 160d are sandwiched by the second hook portion 152a of the first stator side terminal portion 144a, and the first hook portion 150b of the second stator side terminal portion 144b. The connection portions 160e, 160f are sandwiched by the second hook portion 152b of the second stator side terminal portion 144b, and the first hook portion 150c of the third stator side terminal portion 144c.

As shown in FIG. 1, the first stator side terminal portion 144a to the third stator side terminal portion 144c are exposed below the support disk 16 via the passage hole 76 formed in the support disk 16. As a result of this exposure, when the circuit board 14 is held on the support disk 16, the clamp portions 154a to 154c of the first stator side terminal portion 144a to the third stator side terminal portion 144c face toward the three bus bars 121, respectively. The bus bars 121 are held by the clamp portions 154a to 154c in this state.

In this state, the first stator side terminal portion 144a to the third stator side terminal portion 144c are electrically connected to the bus bars 121. Hence, the connection portion 160b, 160c are electrically connected to the control circuit via the first stator side terminal portion 144a. Similarly, the connection portions 160d, 160e are electrically connected to the control circuit via the second stator side terminal portion 144b. The connection portions 160f, 160a are electrically connected to the control circuit via the third stator side terminal portion 144c.

The rotor 50 includes the rotation disk 140 shown in FIG. 1. This rotation disk 140 is supported by the rotation shaft 20 rotatably inserted in the first bearing holder 70 and the second bearing holder 72. The rotation disk 140 has a bottomed cup shape including a sidewall portion 162 and a circular bottom surface 164. A plurality of permanent magnets 170 are held on an inner surface of the sidewall portion 162 formed substantially hanging down from the circular bottom surface 164, and face toward the teeth portions of the stator 54. When the rotation disk 140 rotates with the rotation shaft 20, the permanent magnets 170 also integrally rotate with the rotation disk 140.

The circular bottom surface 164 of the rotation disk 140 faces upward. The circular bottom surface 164 is exposed together with the rotation shaft 20 through the rotation shaft insertion opening 52 formed in the annular protrusion portion 46 of the upper half body 26. A predetermined clearance is formed between the annular protrusion portion 46 and the circular bottom surface 164. As is understood from FIG. 1, the sidewall portion 162 is surrounded by the rotation shaft insertion opening 52, and is not exposed to an outside of the air-conditioning blower motor unit 10.

On the circular bottom surface 164, a rotation shaft support portion 172 arranged at a center portion to allow insertion of the rotation shaft 20 provided with the blower fan 22 is arranged as an annular protrusion portion, and a plurality of vent openings 174 facing toward the teeth portions are formed.

The air-conditioning blower motor unit 10 according to the present embodiment is basically configured as described above. Next, a function and an effect of the air-conditioning blower motor unit 10 will be described.

The air-conditioning blower motor unit 10 is assembled as follows. That is, first, the insulators 134a and the insulators 134b with the lower ends of the first stator side terminal portion 144a to the third stator side terminal portion 144c exposed from the first terminal embedded portion 142a to the third terminal embedded portion 142c cover the laminated core 132. Then, wires (windings) are wound around the teeth portions via the insulators 134a, 134b to form the electromagnetic coils. When winding one teeth portion is finished, the wires are stretched to the next teeth portions to wind. This winding is repeated to form the five electromagnetic coils as the U phase electromagnetic coils 122a. Similarly, the V phase electromagnetic coils 122b and the W phase electromagnetic coils 122c are formed.

The connection portions 160b of the U phase electromagnetic coils 122a and the connection portions 160c of the V phase electromagnetic coils 122b are drawn along the first terminal embedded portion 142a. Similarly, the connection portions 160d of the V phase electromagnetic coils 122b and the connection portions 160e of the W phase electromagnetic coils 122c are drawn along the second terminal embedded portion 142b. The connection portions 160f of the W phase electromagnetic coils 122c and the connection portions 160a of the U phase electromagnetic coils 122a are drawn along the third terminal embedded portion 142c.

In addition to the above, the first vibration absorbing rubber member 94 and the second vibration absorbing rubber member 96 are individually made by injection molding. Each of the first vibration absorbing rubber member 94 and the second vibration absorbing rubber member 96 does not include an undercut portion, and therefore is easily demolded. Thus, there is an advantage in easy molding of the first vibration absorbing rubber member 94 and the second vibration absorbing rubber member 96 when made individually.

The large diameter upper end portion 88 of the second bearing holder 72 is press-fitted in the inner hole of the yoke portion having the annular shape at the inner circumference side of the laminated core 132. Subsequently, the second vibration absorbing rubber member 96 is fitted over the small diameter lower end portion 86 such that upper surfaces of the fan-shaped portions 102 (surfaces in which the thickness recessed portions 108 are formed) face toward an outer surface of a bottom portion of the large diameter upper end portion 88, and the radial protrusion portions 92 protruding from the outer circumferential wall of the small diameter lower end portion 86 of the second bearing holder 72 enters the second radial recess portions 104 of the second vibration absorbing rubber member 96.

Figure 4:
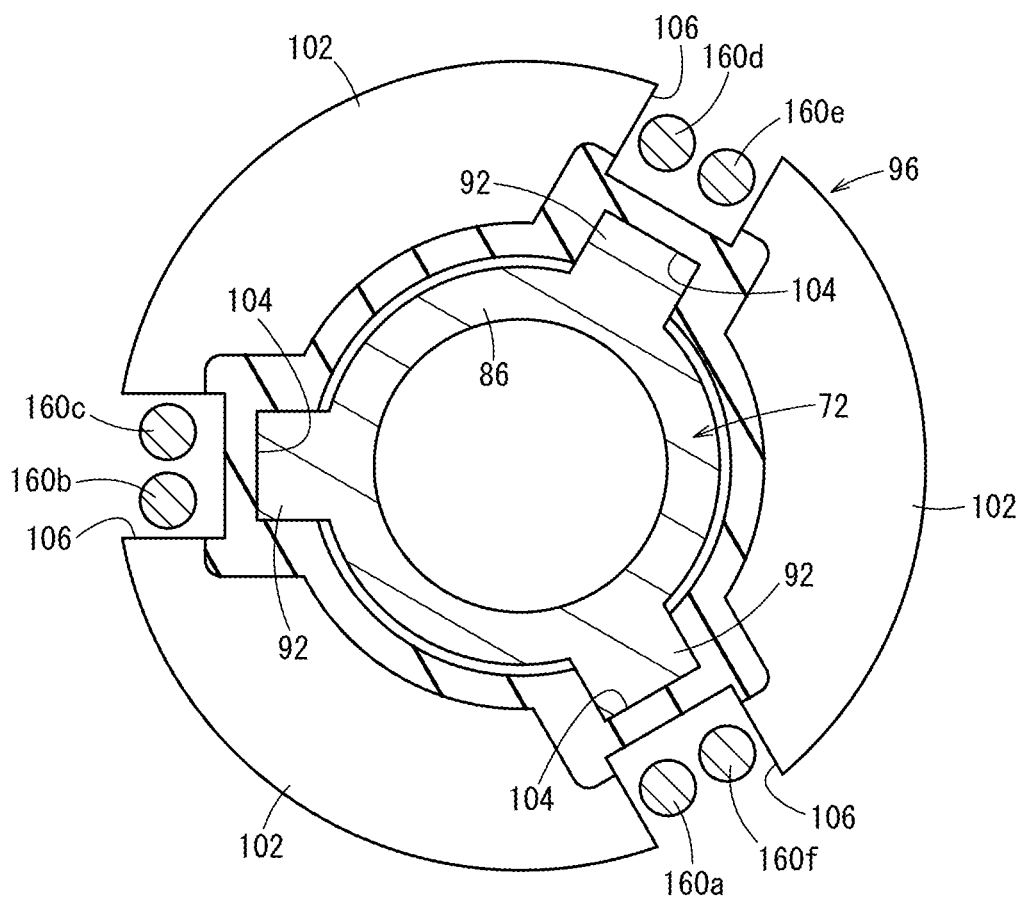
FIG. 4 is a schematic plan view showing a positional relationship between the fan-shaped portion and a connection portion as main parts.
Figure 4:
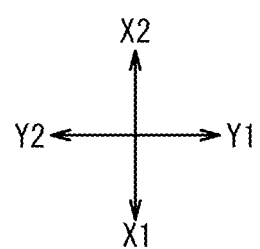

As a result, the upper surfaces of the fan-shaped portions 102 come into contact with an inner end side lower surface of the yoke portion that is not covered by the insulators 134a (that are exposed through the insulators 134a). In this regard, a clearance is formed between the fan-shaped portions 102, and an inner hole of the yoke covering portion 143a of the insulators 134a formed to have a larger diameter than the inner hole of the yoke portion. The first stator side terminal portion 144a to the third stator side terminal portion 144c pass the third radial recess portions 106 and are exposed. In other words, as shown in FIG. 4, the connection portions 160a to 160f are inserted in the third radial recess portions 106. Thus, by inserting the connection portions 160a to 160f in the third radial recess portions 106 as gaps between the adjacent fan-shaped portions 102, the connection portions 160a to 160f can be formed in linear shapes toward the circuit board 14. That is, the brushless motor 12 and the circuit board 14 can be electrically connected to each other at the shortest distance.

The radial protrusion portions 92 and the second radial recess portions 104 fit to lock the second bearing holder 72 by the adjacent fan-shaped portions 102, and to prevent rotation of the second vibration absorbing rubber member 96. As a result, a distal end of the small diameter lower end portion 86 slightly protrudes from the second vibration absorbing rubber member 96.

Next, a diametrically-small, lower end portion (i.e., portions at which the fan-shaped portions 102 are not formed) of the second vibration absorbing rubber member 96 is fitted in the holding hole 74 of the support disk 16. As a result, the first stator side terminal portion 144a to the third stator side terminal portion 144c pass the passage hole 76 formed in the support disk 16 and are exposed toward the lower end surface of the support disk 16. A lower end surface of the second vibration absorbing rubber member 96 and a lower surface of the annular step portion 78 are flush with each other. Then, the distal end of the small diameter lower end portion 86 slightly protrudes downward compared to the annular step portion 78.

Next, the first vibration absorbing rubber member 94 is fitted over the small diameter lower end portion 86 protruding compared to the annular step portion 78 such that the radial protrusion portions 92 enter the first radial recess portions 100. An upper end surface of the first vibration absorbing rubber member 94 comes into contact with the lower end surface of the second vibration absorbing rubber member 96 and the lower surface of the annular step portion 78.

Next, a small diameter upper end of the first bearing holder 70 is press-fitted in a hollow interior of the small diameter lower end portion 86 of the second bearing holder 72. As a result, a step portion of the first bearing holder 70 formed by different outer diameters of the upper end and the lower end, and a step portion of the second bearing holder 72 formed between the small diameter lower end portion 86 and the large diameter upper end portion 88 sandwich the rubber assembly 98 formed by the first vibration absorbing rubber member 94 and the second vibration absorbing rubber member 96. Consequently, the bearing holders are elastically supported on the support disk 16 via the rubber assembly 98.

Next, the second bearing 90 is press-fitted in an inner hole of the second bearing holder 72, and the rotation shaft 20 that holds the rotor 50 is press-fitted in an inner hole of the second bearing 90. Subsequently, the wave washer is inserted in an inner hole of the first bearing holder 70 from below. The first bearing 84 is press-fitted in the rotation shaft 20, and the first bearing 84 is inserted in the inner hole of the first bearing holder 70 to sandwich the wave washer. Thus, the brushless motor 12 in which the rotor 50 (permanent magnets 170) surrounds an outer rim of the stator 54 is composed. That is, the permanent magnets 170 that are supported on the inner surface of the sidewall portion 162 of the rotation disk 140 to compose the rotor 50 face toward the laminated core 132 of the stator 54.

Subsequently, the coupler housing that composes the coupler portion is coupled to the support disk 16 by screwing the holding screws in the cylindrical screw portions 82. Thus, the coupler housing is arranged on the support disk 16, and is not arranged on the circuit board 14. Hence, a sufficiently large mounting space of electronic parts on the circuit board 14 is secured. Consequently, the circuit board 14 contains almost no so-called dead space. In addition, the coupler housing does not overlap the rotation shaft 20 in the plan view.

The assembly of the brushless motor 12 and the support disk 16 obtained as described is assembled to the upper half body 26. That is, the support screws 58 are inserted in the support screw insertion holes 68 of the screw base portion 66 and are screwed to the support screw holes 60 to couple the support disk 16 to the upper half body 26. Simultaneously, the rotation shaft 20 and the circular bottom surface 164 of the rotation disk 140 are exposed through the rotation shaft insertion opening 52 of the upper half body 26.

Next, the circuit board 14 is attached to the support disk 16. That is, the attachment screws 110 inserted in the attachment screw insertion holes 112 of the circuit board 14 are screwed to the attachment screw holes 64 formed in the heatsink portion 62 (fin back surface) and two other portions. Thus, the circuit board 14 is supported on the support disk 16 via the attachment screws 110.

As a result, the three bus bars 121 are respectively connected to the clamp portions 154a to 154c. The conductive member of the coupler housing is connected to wires (printed wires) arranged on the circuit board 14. Thus, the electronic parts mounted on the circuit board 14, and the U phase electromagnetic coils 122a, the V phase electromagnetic coils 122b and the W phase electromagnetic coils 122c are electrically connected. The circuit board 14 is indirectly supported by the upper half body 26 via the support disk 16, and is not directly coupled to the upper half body 26.

Next, the coupling screws 30 are inserted in the coupling screw insertion holes 32 formed in the lower half body 24. Moreover, the coupling screws 30 are screwed in the coupling screw holes 44 formed in the upper half body 26. Thus, the lower half body 24 and the upper half body 26 are coupled. In this case, the outer surface of the first fitting portion 36 is covered by the inner surface of the second fitting portion 38 to fit the lower half body 24 to the upper half body 26. As described above, the casing 18 that houses the assembly (the circuit board 14, the support disk 16 and the brushless motor 12) is composed.

By attaching the blower fan 22 (see FIG. 1) to the rotation shaft 20, the air-conditioning blower motor unit 10 can be obtained. The coupler housing is exposed from the lower half body 24 and is located adjacent to the lower half body 24.

The circuit board 14 is at an offset position at which the circuit board 14 does not overlap the bearing holders as described above. Consequently, it is possible to avoid an increase in dimension in upper and lower directions (thickness direction) of the casing 18. The coupler housing (coupler portion) is adjacent to the lower half body 24, and therefore settles in the range of the thickness of the lower half body 24. Hence, it is possible to avoid an increase in size in the thickness direction of the casing 18. Hence, it is easy to miniaturize the air-conditioning blower motor unit 10.

The air-conditioning blower motor unit 10 is mounted on a vehicle body and assembled in a vehicle air-conditioning device. In this case, unillustrated assembly screws are inserted in the stay portions 42. The assembly screw is screwed to a predetermined member such as a fan casing (not shown) of a so-called scroll shape that surrounds the blower fan 22.

In this state, the wire harness on the vehicle side is inserted in the coupler housing, and is electrically connected to the conductive member. When the vehicle air-conditioning device is operated, the control circuit is supplied with power from the wire harness via the conductive member.

As a result of this power supply, the U phase electromagnetic coils 122a, the V phase electromagnetic coils 122b and the W phase electromagnetic coils 122c are energized via various electronic parts such as the capacitors, the resistors, and the switching elements under control of the control circuit. As a result, the stator 54 generates an alternating magnetic field. When attraction and repulsion repeatedly occur between this alternating magnetic field, and magnetic fields of the permanent magnets 170 that compose the rotor 50, the rotation disk 140 rotates. The rotation shaft 20 and the blower fan 22 rotate integrally with this rotation.

As the power is supplied to the control circuit, the electronic parts and the circuit board 14 are warmed up. This heat is transmitted to the support disk 16 and reaches the heatsink portion 62 of the support disk 16. The heatsink portion 62 is close to the circuit board 14. Consequently, the heat of the circuit board 14 quickly transmits to the heatsink portion 62.

As the blower fan 22 rotates, air around (mainly at the upper side of) the blower fan 22 is caught in the unillustrated fan casing to make an air flow toward a centrifugal direction of the blower fan 22 that is a centrifugal fan. Part of this air flow is introduced from the air introduction port 33 formed in the duct 27 of the upper half body 26 to an inside of the casing 18, and becomes the cooling air that flows through the flow path in the casing 18.

The protrusion portion 34 is formed in the lower half body 24, and protrudes toward the upper half body 26. When the cooling air contacts the protrusion portion 34, the cooling air flows along an inclined side portion at an upstream side. As a result, a traveling direction of the part of the cooling air is changed to a side of the upper half body 26. Thus, the protrusion portion 34 is a guide portion that guides the part of the cooling air toward the upper half body 26.

The part of the cooling air that has flowed toward the upper half body 26 contacts the heatsink portion 62. Hence, the heatsink portion 62 is quickly cooled. As described above, the heat of the circuit board 14 is quickly transmitted to the heatsink portion 62. Consequently, the heat of the circuit board 14 is efficiently dissipated via the heatsink portion 62. Thus, the protrusion portion 34 (guide portion) is formed in the casing 18 to direct the cooling air toward the heatsink portion 62, making it easy to remove the heat of the circuit board 14.

When the heatsink portion 62 is integrally formed as part of the support disk 16, the entire support disk 16 can be used as a heat dissipation member. Consequently, it is possible to increase a heat dissipation area compared to a case where the heatsink that is a different member is coupled to the support disk 16. Consequently, it is possible to miniaturize the air-conditioning blower motor unit 10, and efficiently cool the circuit board 14.

The rest of the cooling air flows over the protrusion portion 34 through the flow path in the lower half body 24 and rises toward the circuit board 14 and the stator 54. The cooling air contacts the circuit board 14, then passes the vent hole 80 of the support disk 16 and further passes a gap between the adjacent teeth portions in the circumferential direction of the stator 54. Thus, the circuit board 14, the support disk 16 and the brushless motor 12 are cooled.

The cooling air is discharged to an outside of the casing 18 via the gap between the rotation shaft insertion opening 52 of the upper half body 26 and the rotation disk 140 of the brushless motor 12, and the vent opening 174 formed in the rotation disk 140. Subsequently, the cooling air is refluxed to the air flow of the blower fan 22 (centrifugal fan).

As the rotation shaft 20 rotates, the first bearing holder 70, the second bearing holder 72 and the stator 54 having the rotation shaft 20 inserted in their inner holes vibrate. According to the present embodiment, the diametrically large lower end of the first bearing holder 70 of the bearing holder and the large diameter upper end portion 88 of the second bearing holder 72 have the substantially same outer diameter which is smaller than that of the yoke portion having the annular shape of the laminated core 132. That is, the diameters and the areas of the bearing holders are reduced as much as possible. Therefore, it is disclosed that, as the bearing holders vibrate, the bearing holders become sound productive. The rubber assembly 98 is interposed between the first bearing holder 70, the second bearing holder 72, the stator 54 and the support disk 16. The rubber assembly 98 has elasticity and contracts and deforms in response to the vibration. This contraction and deformation absorb the vibration.

The second vibration absorbing rubber member 96 forming the rubber assembly 98 surrounds and supports the second bearing holder 72 by the fan-shaped portions 102 of the large areas. Hence, significant vibration caused by fluctuation of a load of the brushless motor 12 (fluctuation of a rotation speed of the rotor 50) is suppressed. Further, the three fan-shaped portions 102 set to the larger diameter than the outer diameters of the first bearing holder 70 and the second bearing holder 72 support a lower surface side of the laminated core 132 from the three directions. Therefore, precession of the brushless motor 12 is suppressed.

The rubber assembly 98 is in contact with the yoke portion of the laminated core 132, the support disk 16, the first bearing holder 70 and the second bearing holder 72 that are metal and have relatively high rigidity. Hence, even when the vibrations are transmitted from the brushless motor 12 to the support disk 16, the first bearing holder 70 and the second bearing holder 72, these members hardly resonate.

In addition, the clearance is formed between the fan-shaped portions 102 and the insulators 134*a*. Consequently, the rubber assembly 98 is prevented from coming into contact with the insulators 134*a* (and the insulators 134*b*) while contracting and deforming. The insulators 134*a*, 134*b* made of the resin have low rigidity compared to metal, yet avoid from producing a contact sound since the rubber assembly 98 is prevented from contacting.

The support disk 16 is formed as a member distinct from the first bearing holder 70 and the second bearing holder 72, and is positioned and fixed in the casing 18 by the support screws 58. Hence, it is difficult to transmit the vibrations from the brushless motor 12 to the casing 18 via the support disk 16.

The above reasons in combination prevent the vibration caused by the brushless motor 12 from transmitting to the support disk 16, the circuit board 14 and the casing 18. The casing 18 is avoided from resonating. Consequently, it is possible to reduce noise of the air-conditioning blower motor unit 10.

The entire brushless motor 12 is housed in the casing 18. Consequently, even when the brushless motor 12 emits an airborne sound, the casing 18 shields this airborne sound. Hence, it is possible to further reduce noise of the air-conditioning blower motor unit 10. Eventually, the present embodiment can compose the small air-conditioning blower motor unit 10 of excellent quietness.

The present invention is not limited to the above embodiment in particular, and can be variously changed without departing from the scope of the present invention.

For example, the vibration absorber is not particularly limited to a two-piece type formed by combining the first vibration absorbing rubber member 94 and the second vibration absorbing rubber member 96. The vibration absorber may be formed by combining three or more members or may be formed by one member.

What is claimed is:

1. An air-conditioning blower motor unit configured to rotate a blower fan by a brushless motor including a stator and a rotor, the stator including a plurality of electromagnetic coils formed by winding wires around an insulation member covering a stator core, and the rotor holding a permanent magnet and rotatable along a periphery of the stator, the air-conditioning blower motor unit comprising:
   a metal bearing holder holding the stator and rotatably supporting a rotation shaft of the brushless motor;
   a circuit board provided with an electronic part configured to control the brushless motor; and
   a metal support disk holding the bearing holder and the circuit board at positions that do not overlap each other,
   wherein the stator core includes a yoke portion that has an annular shape forming an inner hole, and teeth portions protruding from an outer circumference of the yoke portion radially;
   the bearing holder is hollow and includes a first bearing holding member holding the stator, and a second bearing holding member partially inserted into a hollow interior of the first bearing holding member, the bearing holder being smaller in diameter than the yoke portion;
   a vibration absorber is externally fitted to the second bearing holding member, and the support disk has a holding hole for fitting the vibration absorber;
   the support disk elastically holds the bearing holder via the vibration absorber by sandwiching the vibration absorber externally fitted to the second bearing holding member between the first bearing holding member and the second bearing holding member;
   the vibration absorber includes a plurality of fan-shaped portions arranged along a circumferential direction of the rotation shaft;
   between adjacent fan-shaped portions, the bearing holder is locked, and end portions of the wires drawn from the electromagnetic coil pass through; and
   the end portions of the wires are electrically connected to the circuit board.

2. The air-conditioning blower motor unit according to claim 1, wherein a clearance is formed between the vibration absorber and the insulation member.

3. The air-conditioning blower motor unit according to claim 1, wherein the fan-shaped portions protrude from an outer wall in a middle of a thickness direction of the vibration absorber, have a larger diameter than the bearing holder, and have one end surface in contact with one end surface of the yoke portion.

4. The air-conditioning blower motor unit according to claim 3, wherein the vibration absorber includes a first vibration absorber formed by an annular body, and a second vibration absorber formed by an annular body provided with the fan-shaped portions, the second vibration absorber is larger in diameter than the first vibration absorber.

5. The air-conditioning blower motor unit according to claim 4, wherein the second bearing holding member includes radial protrusion portions protruding radially outwardly, and the radial protrusion portions are locked with a portion between the adjacent fan-shaped portions.

6. The air-conditioning blower motor unit according to claim 5, wherein a plurality of passage holes are recessed radially outwardly from an inner wall of the holding hole of the support disk and overlapped with the portion between the adjacent fan-shaped portions,
   a stator side terminal portion protruding toward the support disk grips the end portions of the wires and is embedded in the insulation member,
   the stator side terminal portion and the radial protrusion portions pass through the passage holes and are guided out toward the first vibration absorber, and lower ends of the radial protrusion portions guided out enter an inner surface of the first vibration absorber, and a bus bar unit formed on the circuit board at a position facing an outer surface of the first vibration absorber and the stator side terminal portion are electrically connected on the outer surface of the first vibration absorber.

7. The air-conditioning blower motor unit according to claim 6, wherein the support disk is fixed to a first casing member or a second casing member, and positioned at a hollow interior of a casing formed by the first casing member and the second casing member, the support disk, the circuit board directly held by the support disk, the bearing holder elastically held by the support disk via the first vibration absorber and the second vibration absorber, and the brushless motor fixed to the bearing holder are accommodated in the hollow interior of the casing.

\* \* \* \* \*